(12) United States Patent
Dalley, Jr. et al.

(10) Patent No.: US 9,396,447 B2
(45) Date of Patent: Jul. 19, 2016

(54) SYSTEMS AND METHODS FOR MONITORING A HEADCOUNT

(71) Applicant: Codex Corporation, Maple Grove, MN (US)

(72) Inventors: Kenneth L. Dalley, Jr., Otsego, MN (US); Brett Wilmeth, Hanover, MN (US)

(73) Assignee: Codex Corporation, Maple Grove, MN (US)

( * ) Notice: Subject to any disclaimer, the term of this patent is extended or adjusted under 35 U.S.C. 154(b) by 0 days.

(21) Appl. No.: 13/838,097

(22) Filed: Mar. 15, 2013

(65) Prior Publication Data

US 2014/0266726 A1    Sep. 18, 2014

(51) Int. Cl.
  *G08B 13/14*    (2006.01)
  *G06Q 10/06*    (2012.01)
  *G08B 13/24*    (2006.01)
  *G08B 21/22*    (2006.01)

(52) U.S. Cl.
  CPC ............ *G06Q 10/06* (2013.01); *G08B 13/2451* (2013.01); *G08B 21/22* (2013.01)

(58) Field of Classification Search
  CPC .................................................. G08B 13/2451
  See application file for complete search history.

(56) References Cited

U.S. PATENT DOCUMENTS

| 5,218,344 A * | 6/1993 | Ricketts ...................... 340/573.4 |
| 2005/0278639 A1 * | 12/2005 | Becker ........................... 715/741 |
| 2007/0203768 A1 * | 8/2007 | Adra .................................. 705/7 |
| 2008/0218335 A1 * | 9/2008 | Attar ...................... G06Q 50/26 340/539.13 |
| 2010/0253521 A1 * | 10/2010 | Williams et al. ............ 340/572.1 |
| 2011/0225071 A1 * | 9/2011 | Sano ............................... 705/28 |

* cited by examiner

*Primary Examiner* — Omeed Alizada
(74) *Attorney, Agent, or Firm* — Schwegman Lundberg & Woessner, P.A.

(57) ABSTRACT

The disclosure relates to systems and methods for monitoring a headcount with RFID. Such a system can include a plurality or transponders, each transponder of the plurality of transponders associated with an offender. The system can include a plurality of radio frequency identification readers configured to transmit an interrogating signal to one or more transponders of the plurality of transponders and receive an identifying signal in response to the one or more transponders receiving the interrogating signal, the plurality of radio frequency identification readers associated with at least one programmable event, the at least one programmable event including a headcount. The system can include a server configured to receive data from the plurality of radio frequency identification readers through a network and determine if there is a discrepancy in the headcount.

13 Claims, 5 Drawing Sheets

SYSTEMS AND METHODS FOR MONITORING A HEADCOUNT

BACKGROUND INFORMATION

Officers at secure facilities face many challenges in monitoring the whereabouts of inmates. Such monitoring can include visual inspection and verification on a strict schedule. Such monitoring can also require the Officers to determine if the proper number of inmates is present on the facility premises at a given time.

DETAILED DESCRIPTION

Figure 1:
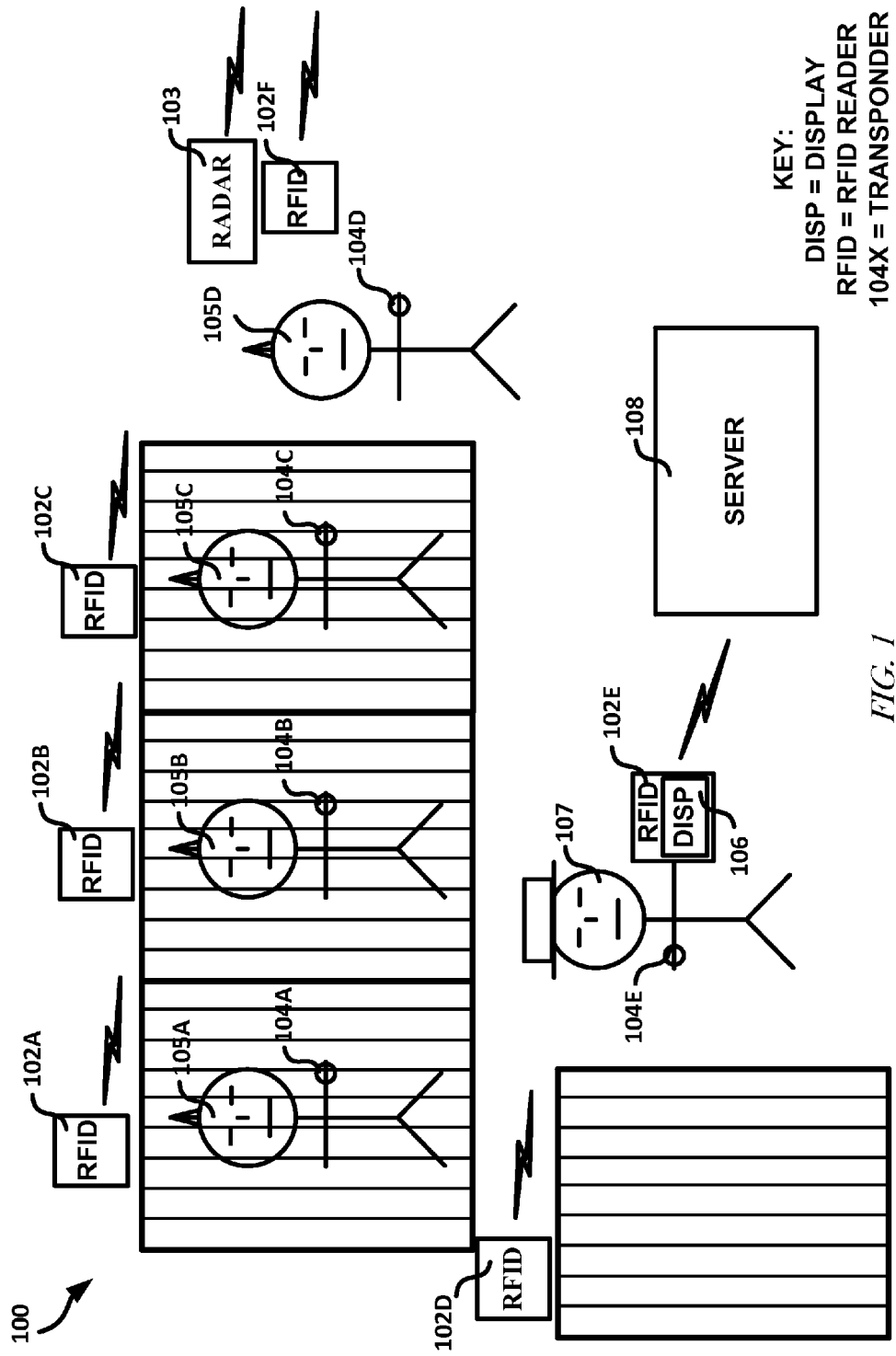
FIG. 1 illustrates a diagram of an example of a secure premises, according to an example embodiment.

Various embodiments illustrated and described herein provide solutions to efficiently and accurately document information about offenders (e.g., inmates). These and other embodiments are described, with reference to the figures, herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter.

Such embodiments of the inventive subject matter may be referred to, individually and/or collectively, herein by the term "invention" merely for convenience and without intending to limit the scope of this application to any single invention or inventive concept if more than one is in fact disclosed. The following description is, therefore, not to be taken in a limited sense, and the scope of the inventive subject matter is defined by the appended claims.

The disclosure presents methods and apparatuses for automating offender documentation using one or more Radio-Frequency Identification (RFID) readers. The RFID reader can scan for a transponder associated either directly or indirectly with an offender. The scanning can cause information associated with the item associated with the transponder to appear on a display coupled to the RFID reader. The user scanning the transponder can view, add, or alter the information that is displayed when the transponder is scanned. The RFID reader can send the data collected from the scan to a web service or middleware for analysis. Alternatively, the RFID reader can do at least a portion of the analysis itself. The information that is entered can be saved to remote or local databases. In this way, managing information about an offender or an item associated with the offender can be automatically maintained and updated. Such a system can be advantageous when implemented in a detention center, incarceration facility, mental health facility, or any other place where information about people can be automatically tracked and managed.

Secure facility agencies face logistical, communication, and records management challenges when managing offenders (e.g., incarcerated persons). This includes processing, providing care, and collecting a wide range of information about each of the offenders. Various embodiments illustrated and described herein include systems, methods, and software to assist in such situations. For example, typical embodiments assist in rapid recording and monitoring a wide range of data about offenders including position of the offender at a given scan time and direction the offender was traveling at a given scan time. One or more embodiments may do so in a user-friendly and efficient manner via a networked computing environment.

Custodians of persons in a facility manage many responsibilities including a significant amount of documentation in order to capture data pertinent to each person they are responsible for. Custodians (e.g., secure facility officers) may face challenges in managing persons in their facilities, such as tracking their location or making sure that all such persons are present in their facility. To help mitigate risks, some embodiments herein include systems, methods, and software that provide automated inmate headcounts with RFID. The automated inmate headcounts can include monitoring for the presence or absence of a number of offenders and verifying that the monitoring results are consistent with expected results.

These and other advantages can be realized using one or more embodiments disclosed herein. The systems, methods, and software are now described in more detail with reference to the drawings.

FIG. 1 illustrates a networked system 100 configured for automated offender documentation, according to an example embodiment. The system 100 can include one or more RFID readers 102A-102F, one or more transponders 104A-104D, or a server 108.

The RFID readers 102A-102F can be mobile (e.g., handheld) or fixed in the area in which they are deployed. An example of a fixed RFID reader 102 includes a portal-based RFID reader 102 that forces an offender 105 to walk through a portal within range of the RIFD reader 102. In the example shown in FIG. 1, RFID readers 102A-102D and 102F are fixed, while RFID reader 102E is mobile. The RFID readers 102A-102F can be assigned a name (e.g., a collection of characters, letters, numbers, or other symbols) to uniquely identify the RFID reader 102. The RFID readers 102A-102F can each be assigned to a specific location. The RFID reader's location can be configured such that the RFID readers 102A-102F, in aggregate, can monitor a substantial portion of the area in which they are deployed for the presence of a transponder 104A-104D. In one or more embodiments, the RFID readers 102A-F can be configured to detect a transponder 104 located within a specific range of the RFID reader 102A-102F. In such embodiments, the RFID reader 102 can send an interrogating signal to a transponder 104 and receive an identifying signal in response to the transponder 104 receiving the interrogating signal. The identifying signal can include a unique identifier corresponding to that transponder 104. The RFID reader 102 can be internal or external to a building on the premises in which the system 100 is deployed. For example, RFID readers 102A-D can be internal to a detention center building, RFID reader 102E can be either internal or external to the detention center building, and RFID reader 102F can be external to the detention center building, such as in a courtyard or a recreation area.

The RFID readers 102A-102F can each be assigned to a specific customer (e.g., an entity interested in using an automated offender documentation system). Such an assignment can help a data center manage information received from the RFID reader 102. The RFID readers 102A-F can be connected to a server 108 or a network 213 (see FIG. 2) through a wired or wireless connection (indicated by a lightning bolt in FIG. 1). A wired connection can include an Ethernet connection or other protocol operable to connect the RFID readers 102A-102F to the server or network. A wireless connection can include Wi-Fi, Bluetooth, Zigbee, or other protocol operable to wirelessly connect the RFID readers 102A-102F to the server 108 or network 213.

An RFID reader 102A-102F can be associated with one or more programmable events 220. A programmable event 220 can include an offender head count, location verification, or other event. For example, the RFID readers 102A-102F can be programmed to perform a scan at a particular time. The results of the scan can be sent to the server 108. The results retrieved can be compared to a list of expected results. If the comparison shows an irregularity or a deviation from what is expected, a warning or alert can be sent to the proper personnel (e.g., one or more custodians responsible for managing the person associated with deviation). The proper personnel can then respond to the situation. In the case of a detention center, a warning can be sent to a detention facility officer in charge of the offender 105 corresponding to the deviation. The system can enable one or more RFID readers 102 to perform one or more pre-programmed programmable events, such as simultaneously or on a scheduled or non-scheduled basis. The programmable events can enable the RFID readers 102 and the system to be flexible in implementing or at least partially automating a wide range of offender documentation services. The programmable events can allow an RFID reader 102 to help perform multiple tasks simultaneously.

One or more user defined monitoring rules 222 can be assigned to a programmable event 220. User defined monitoring rules 222 can include offender 105 movement restrictions (e.g., offender 105A is not to be outside his cell at a certain time) or offender relation restrictions (e.g., offenders 105A and 105B are not to be within a certain distance of each other). The monitoring rules 222 can include an offender's housing assignment or times that an offender is to be in there cell. Other user defined monitoring rules can include ensuring one or more inmates arrive to a pre-defined destination within a predefined amount of time, validating that inmates assigned to a housing unit are present (e.g., conducting a head count), or notifying system users that an RFID reader 102 detected a transponder 104 when no transponder 104 detection was expected or allowed.

User defined processes can be assigned to a programmable event 220. User defined processes can include, for example, that a web service can search for a predefined restriction (e.g., a monitoring rule 222) that might preclude an inmate from being able to enter a certain room or area or that two or more inmates are not allowed to associate with each other (e.g., be within the same room or area of the facility). The user-defined processes can validate that a direction an inmate was detected walking is acceptable. This can be accomplished using radar. The user-defined processes can include a user causing an RFID reader 102 to scan for a transponder 104 in a specific location (e.g., a multi-purpose room, such as a rec room).

A programmable event 220 can be associated with more than one RFID reader 102. For example, in the example of doing a head count in a secure facility a programmable event 220 can trigger RFID readers 102A-120D to determine the number of offenders in their cell, housing unit, or some other location, such as an infirmary or recreation yard. Associating a programmable event 220 with an RFID reader 102 can be done automatically, such as by a computer processor, or can be done manually by a user through an application configured to manage the configuration and implementation of an offender documentation system. The server 108A or 108B can instruct or poll the RFID readers 102A-102F for collected data or the RFID readers 102A-F can be programmed to send the collected data to the server 108A-108B or the service 216. The data can be sent as soon as the data is collected, on a pre-determined schedule, or a combination thereof.

One or more of the RFID readers 102A-102F can be configured to constantly or intermittently monitor for a nearby transponder 104 (e.g., a passing transponder 104 or a transponder 104 that has moved within range of the RFID reader 104). Such RFID readers 102 can be helpful in monitoring areas where transponders are not expected to be or in monitoring transit points to monitor the progress of offenders 105 in transit. When one of these RFID readers 102 detects the presence of a transponder 104, an alarm or message can be sent to the proper personnel, such as through the server 108 or the network 213. The message or alert can be a text message, or other content message, to a mobile device, an email (e.g., including an attachment), or other notification.

The data sent from the RFID readers 102A-102F to the server 108 can be encrypted. The data from the RFID reader 102 can be sent to a server 108 that is running middleware 224 (e.g., software that provides services to a software application beyond those available from an operating system or an application that logically and physically runs between a sender and a receiver).

In one or more embodiments, rather than using middleware 224 or calling one or more services 216 (e.g., services provided over the internet or through the network with or without the internet), the RFID reader 102 can include one or more services, which may be in the form of an application programming interface (API), database connectivity client, or other logical element to perform the functions of the middleware 224 or the service 216. An example of an RFID reader 102 that can be used to perform the functions of the middleware or the service 216 is the FX7400 RFID reader from Motorola, Inc. of Schaumburg, Ill.

The RFID reader 102E can include a screen configured to display information related to scanning a transponder 104. The RFID reader 102E can be configured to display, such as on display 106 a schedule to a user indicating when or where RFID reader 102E scans are to occur.

The radar module 103 can be situated near an RFID reader 102F to detect a number of offenders 105 passing thereby or to detect a direction an offender 105 is travelling. The radar module 103 can be incorporated into an RFID reader 102. Including the radar module 103 in the system can help a system determine the number of offenders 105, the direction each offender 105 is travelling, or the like of a transponder 104 within range of the radar module 103. Such information can be relayed to the server 108. The information sent to the server 108 can be accompanied by an identification of the transponder 104 and a nearby RFID reader 102.

The RFID reader 102 can include one or more radar modules 103 electrically or mechanically coupled thereto. An example of such a radar module or people counter is the OBID® i-Scan® from Feig Electronic of Germany. Such radar modules are operable to detect persons moving towards and going away from the radar module or the associated RFID reader 102. The direction can be determined by transmitting a signal, monitoring for signal reflections, and detecting how much time it takes for the reflection to be detected by the radar module 103.

The transponder 104 can transmit a unique identifying signal that is recognizable by an RFID reader 102. In one or more embodiments, the transponder 104 can emit the identifying signal in response to a signal sent from the RFID reader 102. The transponder 104 can be incorporated into a bracelet, a chip configured to be embedded in clothing, an implantable device, an identification card, or may take some other form that allows the transponder 104 to travel with an offender 105 (e.g., inmate) or an item of interest. The transponder 104 can be assigned to an individual offender 105 or an entity at the secure facility other than an offender 105, such as a detention center officer 107. In a system that includes a transponder 104 associated with an entity at the secure facility, the system can detect when the entity (e.g., detention center officer 107), is near an offender 105.

The server 108 can be configured to run a web application 210 or middleware 224 configured to implement or manage automatic offender documentation. The server 108 can receive data from the RFID readers 102A-102F. The data received can include a unique identification (ID) key that identifies the RFID reader 102A-102F that sent the data. The server 108 can look up the RFID reader ID and correlate a specific time or location with the RFID reader 102A-102F. The server 108 can send the time, location, and RFID ID data to another server 108B, such as at a data center 218.

The server 108 can be part of a Local Area Network (LAN), or it can be hosted remotely. The middleware 224 that can be accessible through the server 108 can either be hosted locally (e.g., through a LAN) or remotely. The middleware 224 can send data received or modified by the server 108 or middleware 224 to a service 216.

Figure 2:
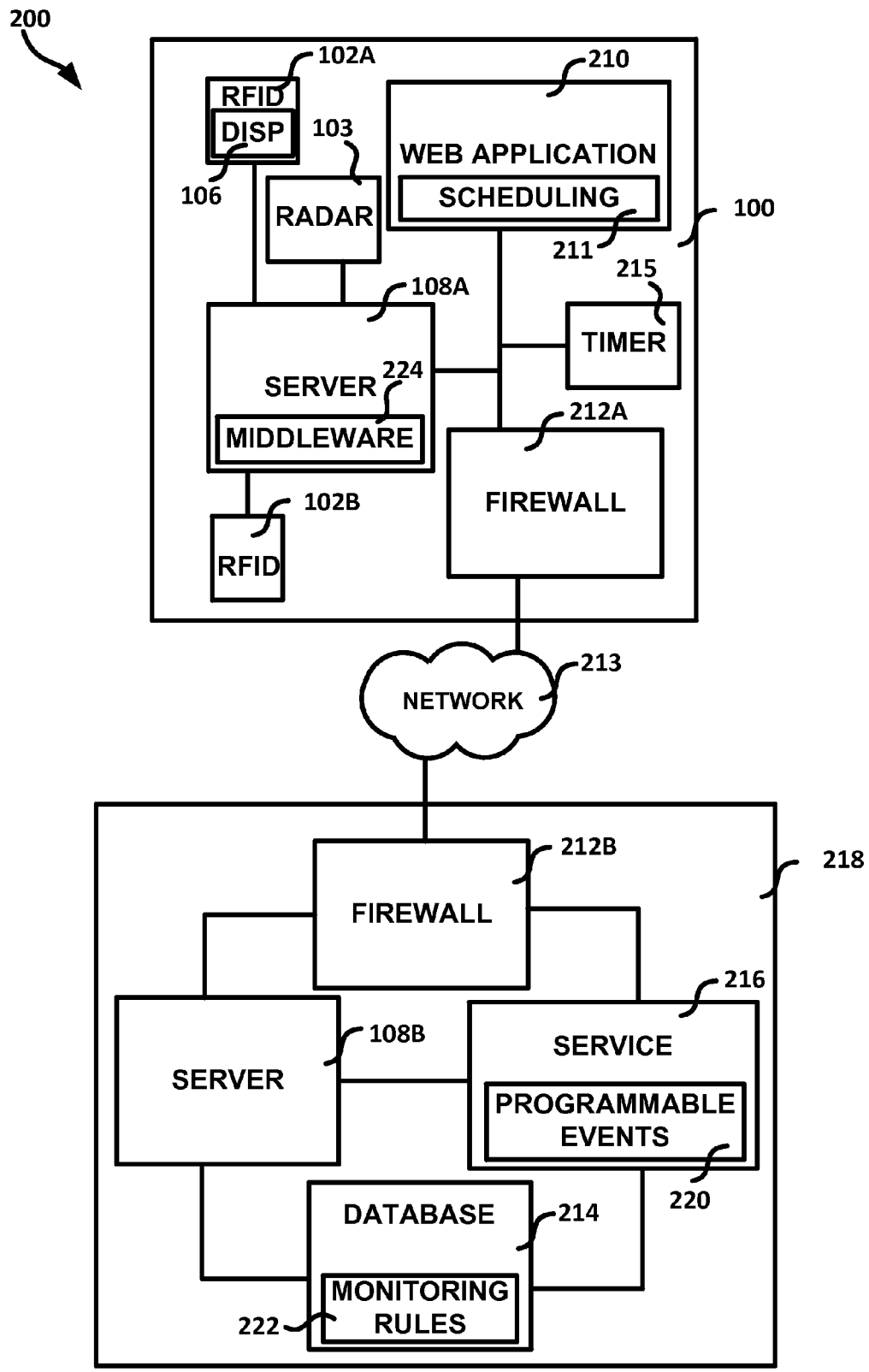
FIG. 2 illustrates a logical block diagram of an example of a networked system for monitoring a headcount, according to an example embodiment.

FIG. 2 illustrates an example of a networked system 200 for automated offender documentation. The networked system can include the RFID readers 102A-102B the server 108A, a web application 210, or a firewall 212A. The RFID readers can be coupled to the server 108A such that data can be sent to the server 108A from the RFID reader 102A-102B and data can be sent to the RFID reader 102A-102B from the server 108A. The server 108A can be coupled to the web application 210, such as to host the web application 210. The server 108A can be coupled to the firewall 212A so data sent from and received at the system 100 can be protection scanned, encrypted, or decrypted.

While the server 108B, service 216, and the database 214 are depicted as individual units, they may be implemented on one or more servers. For example, the server 108B, service 216, and database may all be implemented on the same server, or each may be implemented on its own server.

The web application 210 can render web pages that can provide the functionality of the service 216 to a user. The web application can be hosted locally, such as on server 108A, or remotely, such as on server 108B.

The networked system can include the system 100 coupled to the data center 218, such as through a network 213 (e.g., the internet). Such a configuration can allow the data storage for and analysis of monitoring RFID reader 102 and transponder 104 interactions to be off site. The data center 218 can include a firewall 212B coupled to a server 108B and a service 216, such that the firewall 212B can help to ensure that the data sent to the server 108B and the service 216 will not harm the server 108B or service 216. The server 108B can be coupled to a database 214, such that the database 214 can provide data to the server and receive data from the server 108B. The server 108B can be coupled to the service 216, such that the service 216 can provide functionality related to automated offender documentation to the server 108B. The data received at the server 108B can be used in rendering web pages to users. The database 214 can be coupled to the service 216 to provide data to the service 216 and to receive and store the results of operations performed by the service 216.

The firewalls 212A-212B can scan incoming and outgoing data for malware to help reduce the chances of a malicious attack on the system 200. The firewall 212A can encrypt data that is outgoing or decrypt data that is incoming. The encryption or decryption can be accomplished using a separate encryption or decryption module and can be incorporated at different places in the system such as on an RFID reader 102, so as to allow encrypted data sent to be sent to the server 108B.

The service 216 can be deployed locally on the server 108B or hosted remotely. The service 216 can retrieve programmable events 220 currently assigned to an RFID reader 102. The programmable events 220 can be stored in the database 214, on the server 108A-108B, or on the service 216. The service 216 can run processes associated with a programmable event 220. For example, the service 216 can analyze, organize, or format collected data. The analyzed, organized, or collected data can be sent to the database 214 for retention. The analysis can include comparing the data to monitoring rules 222 associated with a programmable event 220. Such comparisons can monitor compliance and detect violations of the monitoring rules 222 and an alarm, alert, or message can be sent to the proper personnel when a monitoring rule 222 has been violated.

The service 216 can correlate collected data. A correlation of data can help the service 216 detect a violation of a monitoring rule 222. A correlation can be performed at an individual offender level, a block level, an entire building (e.g., secure facility, such as a detention center, mental health facility, or the like) level, or other level. For example, the service 216 can correlate all data associated with the same offender or a cellblock and compare that data to the monitoring rules 222 relating to the offender or the cellblock to determine if the offenders 105 comply with the monitoring rule or a violation has occurred. The service 216 can compare one offender's data to another offender's data to determine if a monitoring rule 222 violation has occurred. Such comparisons can be useful when a monitoring rule 222 states that two or more offenders are to be kept separately, not contact each other, or otherwise not associate with each other. The service 2126 can be hosted locally (as shown) or can be hosted on the network 213 (e.g., cloud).

The service 216 can receive and process data from the middleware 224. The processing can include authenticating a customer name. Authenticating a customer name can be done by verifying a customer's port number in examples where a customer has been assigned a unique port number. Authenticating can also include verifying RFID reader 102A-102F ID information and transponder 104A-D ID information received is consistent and assigned to that customer. A user (e.g., an end user) can automate the running of programmable events 220 through scheduling them through the service 216. A user can manually trigger a programmable event 220 to for the service 216 to execute. The user can customize the operations performed by the service 216 in running a programmable event 220, such as through the server 108A-108B or web application. The service 216 can compare data received to monitoring rules 222 and determine if a monitoring has been violated. The service can initiate an alert process in response to determining that a rule has been violated.

The database 214 can store monitoring rules 222 therein. The monitoring rules 222 can define the relationship between or validate the performance expectations between a programmable event 220 and a transponder 104. This can include cross-referencing other monitoring rules 222 (e.g., restrictions or requirements) associated with a given transponder 104. For example, an offender 105 could be restricted from moving or from entering a specific room or area of a building. The rule or restriction could be for punitive reasons, health concerns, safety concerns, or the like. For example, a monitoring rule 222 can indicate that one or more inmates are to be kept separate at all times. The monitoring rule 222 can have an associated duration in which the monitoring is valid and is to be referenced by the service 216. One or more monitoring rules 222 can be associated with a specific offender such that when the offender is no longer in the building, the monitoring rule 222 is no longer referenced by the service 216.

The service 216 can analyze the data received from the RFID readers 102A-102F and compare the received data to relevant monitoring rules 222 to determine if an alert or message should be sent to the relevant personnel. If no violation is detected the service 216 can initiate a sequence of operations (e.g., a pre-programmed sequence of operations, processes, or events) to complete. For example, the service 216 can look for a violation of a user defined process rule (e.g., an inmate is travelling the wrong direction or there are too many inmates in a specific area). The service 216 can then search for violations of monitoring rules (e.g., a first inmate cannot be in a specific area because a second inmate is already present in the area, an inmate is not allowed to be in the rec area, or other monitoring rule violation). The service 216 can then continue to perform another process (e.g., a user defined process), such as documenting the locations of inmates that are within the range of an RFID reader 102. Future data received can be analyzed (e.g., compared to monitoring rules 222) in real-time to determine if an alert or message is to be sent. When the analysis is complete, the service 216 can record that the analysis was completed in the database 214.

In the case of an Internet failure (e.g., the Internet is temporarily unavailable) the middleware 224 can be configured to store received data in a local memory. When Internet connectivity is restored, the received data can be sent to the service 216. Such a configuration can be helpful in embodiments that include Software as a Service (SaaS) or a remotely hosted server. The middleware 224 can be configured to determine if a monitoring rule 222 has been violated, such as when the Internet connection to the service has failed. In one or more embodiments, the middleware 224 includes a subset of all the monitoring rules 222 for a specific system. These monitoring rules 222 can be the most important rules (e.g., the rules that the user does not want violated). In one or more embodiments, the service 216 can determine if a monitoring rule 222 has been violated after it has received the relevant data.

The middleware 224 can reside on the server 108A or 108B, locally or remotely, respectively. In one or more embodiments, the middleware 224 can be hosted in a network 213 (e.g., cloud) server. Such an implementation can provide automated offender documentation to a user through a Software as a Service (SaaS) configuration. The middleware 224 can provide communication between the RFID readers 102A-102F and the data center 218. The middleware 224 can be configured to encrypt data it receives from the RFID readers 102A-F and send the encrypted data to the service 216, server 108B, or the database 214.

The database 214 can store data from the RFID readers 102A-102B, the service 216, the web application 210, or the server 108A-B.

A user can create one or more monitoring rules 222 associated with a scheduled or a non-scheduled headcount. A headcount (e.g., scheduled or non-scheduled headcount) can be performed using RFID readers 102 and transponders 104 at various locations. For example, a headcount can be performed at a housing unit, pod, cellblock, living unit, infirmary, program room, recreation area, dining area, entire premises, portion of a premises, a combination thereof, or the like. A single headcount can be configured to determine how many transponders 104 are in one or more specified locations, or whom the transponders 104 correspond to.

A user can define how many headcounts to perform, where to perform them, and who will receive an alert or message if the headcount process reveals a discrepancy (e.g., an inconsistency in the transponders 104 detected in the location and the transponders expected to be present in the location).

A timer 215 can be configured to determine the amount of time it takes to complete a specific headcount. The timer 215 can measure the amount of time it takes to complete a headcount, such as a headcount to determine if all offenders 105 are present or accounted for in a specified location.

A headcount can be a programmable event 220 and can be associated with one or more specific RFID readers 102. The RFID readers 102 can be in or near (e.g., within range of) a location (e.g., recreation area, cellblock, lunch hall, or the like) associated with the headcount. In response to a headcount activation (e.g., automatic or manual activation), the RFID readers 102 associated with the programmable event 220 defining the headcount can identify the transponders 104 within range of those RFID readers 102. The server 108A (e.g., middleware 224), service 216, an RFID reader 102 with computing capability, or a device with a corresponding mobile application can determine (e.g., in real-time) if the data retrieved is as expected. Determining that the data is as expected can include comparing a detected plurality of transponder 104 unique identifiers to an expected set of transponder 104 unique identifiers to be received in the headcount. The comparison can be on a unique identifier level or on an overall number of transponder level. For example, a comparison can be done that compares a list of detected transponders 104 (e.g., unique identifiers of the respective transponders) to a list of transponders 104, or the comparison can be done by determining the number of transponders 104 detected and comparing to an expected number of transponders 104 to be detected. If the numbers or the unique identifiers do not match, a discrepancy can be detected.

Detecting a discrepancy can include cross-referencing data that indicates the absence of an offender 105. For example, data in the database 214 can indicate that a particular offender 105 is currently in the infirmary. The service 216, or other item in the system 200, can determine that the headcount does not fail if that offender 105 in the infirmary is missing from the headcount.

If the headcount does fail, a message or alert can be sent to the proper personnel. The alert or message can identify the offender 105 that was expected to be in the headcount, but is missing. The message or alert can identify a location the missing offender 105 was expected to be.

Figure 3:
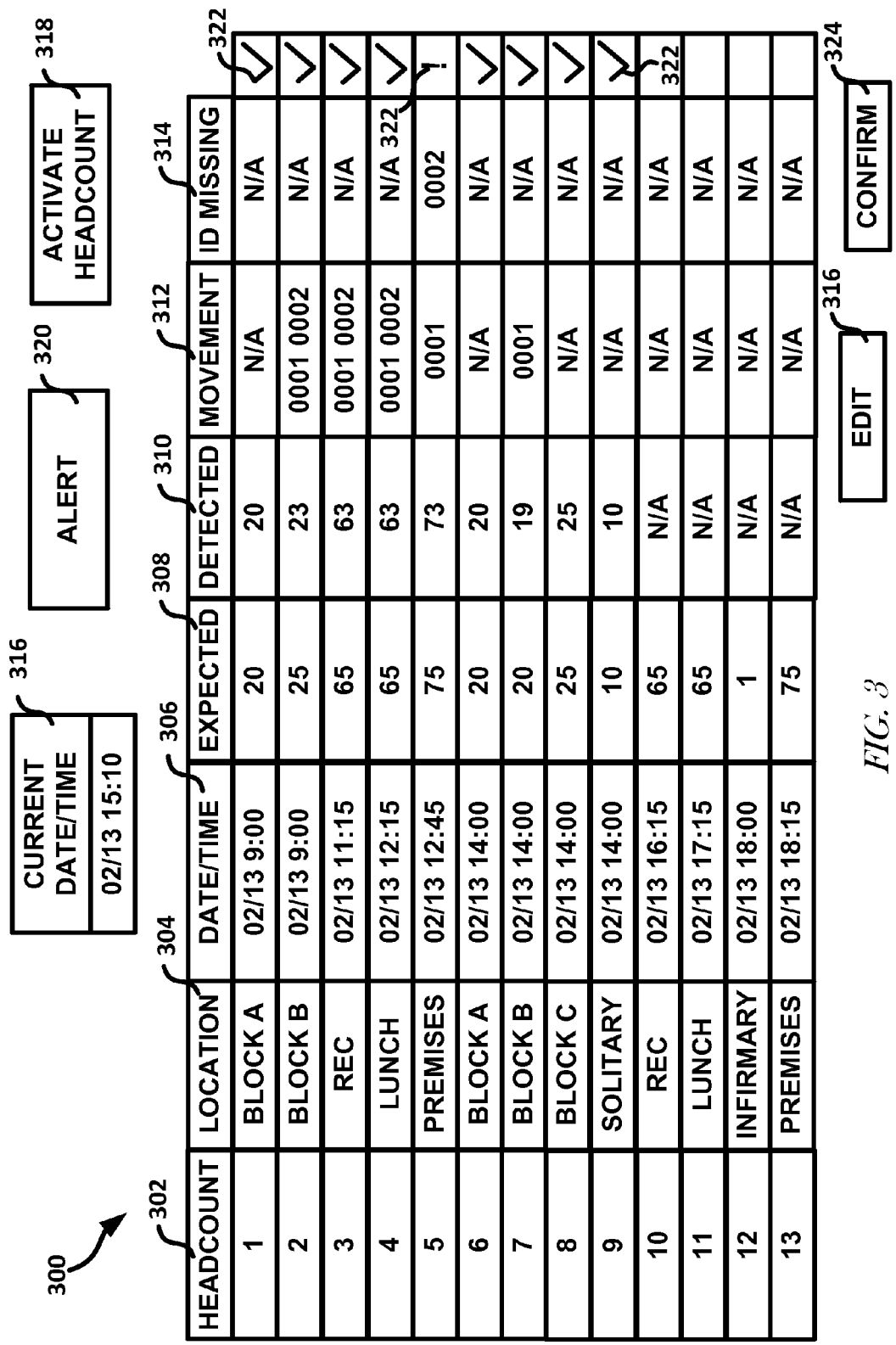
FIG. 3 illustrates an example of a user interface for monitoring a headcount, according to an example embodiment.

Headcounts can be initiated through a mobile application, such as by activating a button on a user interface (e.g., an activate headcount button 318 on user interface 300 of FIG. 3). The mobile application can be loaded onto a device (e.g., a mobile communications device) and can "sync" or download headcount data using a wired (e.g., Ethernet) or wireless (e.g., Wi-Fi) connection. Such a mobile application can download the data while or after the data is collected by an RFID reader 102. A mobile RFID reader 102 (e.g., a device with a mobile RFID reader application executing thereon) can scan a transponder 104. Such a mobile RFID reader 102 can help in scanning a transponder 104 of an offender 105 who chooses to be non-compliant in having their transponder automatically scanned for. In the case of a defective or damaged transponder 104, an offender's 105 information can be manually entered into the system, such as to bring a headcount into conformance with expectations. Data that is manually entered into the system 200 can be tagged as manually entered, such as by an icon displayed next to the manual entry, having the entry offset in a different color than usual, or adding one or more characters to the entry.

The results of a headcount can be displayed to a user through a user interface of the web application 210 or a mobile application. FIG. 3 illustrates an example of a user interface 300 (e.g., a headcount dashboard interface). The user interface 300 can include the number of transponders 104 and associated offenders 105 expected 308 to be detected in the headcount and the number of offenders 105 who were detected 310, whether by RFID reader 102 scan or manual entry. The user interface can include a list of offenders 105 who were not present during the headcount because of a previously logged movement 312 or offenders 105 that would normally be included in the headcount that are currently at other locations.

A user can accept or confirm the results of a headcount by activating a confirm button 324 in the user interface 300. A record of the user accepting or confirming the results of the headcount can be created in the database 214, such as for reporting or communication purposes. The status of the headcount can be updated in the database 214 or on the user interface 300, such as in response to the user activating the confirm button 324. The timer 215 can be stopped in response to the user activating the confirm button 324 and the time it took to complete the headcount can be recorded in the database 214 for statistical or other analytical purposes. If a user does not activate the confirm button 324 within a specified period of time (e.g., one minute, five minutes, ten minutes, etc.) the headcount programmable event 220 can auto-confirm the headcount results.

If there is a discrepancy in the headcount results, a user can activate an alert button 320 in the user interface 300. The application (e.g., the web application 210 or the mobile application) can provide an alert to a user in response to the user activating the alert button 320. Such a configuration can allow a user to "tag" offenders 105 who are not accounted for in the headcount and not logged as being elsewhere (e.g., out of their cell), at least temporarily.

The headcount alert can send (e.g., automatically) an email, text message, or other content message, to a user. The headcount alert can automatically send a message or alert to a device hosting a mobile or web application. The alert or message can be sent to predefined recipients to notify them of the offender 105A that was not tagged in the headcount. A user (e.g., the user who initiated the headcount) can manually update the alert by adding information regarding the location of the offenders 105 tagged in the alert. For example, if a user failed to log an offender 105A movement, such that the system 200 did not have record of the movement, a subsequent headcount can trigger an alert that the offender that moved is missing from the headcount. The user who failed to log the movement can record the movement (e.g., manually) in response to receiving, or after the headcount is complete. The log can be created through a user activating the edit button 316 and adding information to the system to make a record of the movement.

Similarly, information regarding an offender 105 who was identified in a headcount alert whose whereabouts is identified after the alert was sent, can be updated by a user who has sufficient privileges and knows where the offender 105 is. The updating can be accomplished through a user activating the edit button 316, and indicating where the offender 105 is located. The system 200 can reevaluate a discrepancy in the headcount in light of the information entered by the user after activating the edit button 316. If the location of an offender 105 is unknown before a headcount, but is known after the headcount, the system 200 can be updated (e.g., manually or automatically) to include the location of the offender 105. Such updating can be done through a user interface 300 (see FIG. 3) of a mobile or web application 210. When all offenders 105 expected to be in the headcount are accounted for the system 200 can indicate the headcount is complete or in conformance, such as by showing a checkmark in a status column as shown in FIG. 3.

Such user interfaces 300 can allow a user to view headcount activity throughout a facility (e.g., in real-time). The user interface can display a current date or time 316 so a user can determine how much time there is before the next listed headcount 302 occurs. The user interface 300 can display the results of previously completed headcounts. In the example shown in FIG. 3, headcounts 302 1-9 have occurred previously and headcounts 10-13 are scheduled to occur later. The user interface 300 can display one or more locations 304 associated with the listed headcount 302.

By looking at the user interface 300 a user can determine which headcounts were successfully completed (e.g., as indicated by indicators 322). The indicators 322 can be clickable links. A user can click on the indicator 322 to view details regarding the corresponding headcount. The details can include the time it took to perform the headcount, which offenders 105 were detected automatically or manually entered, or other data regarding the headcount.

Figure 4:
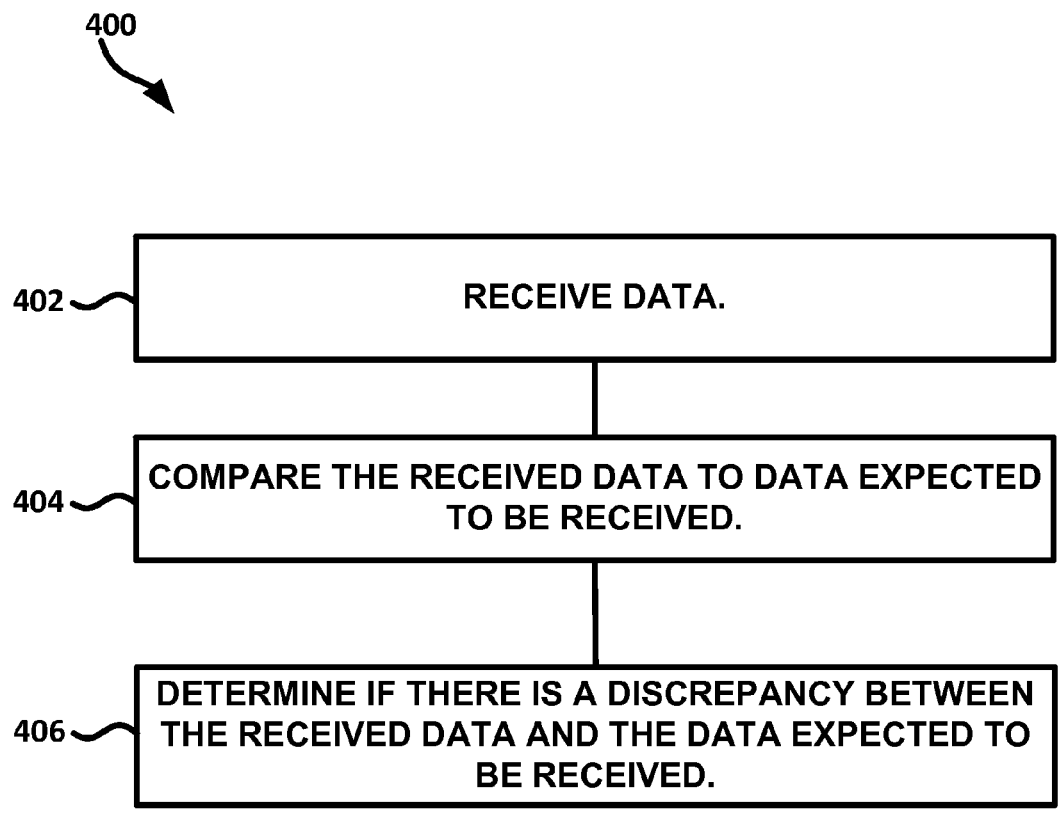
FIG. 4 illustrates another example of a technique for monitoring a headcount, according to an example embodiment.

FIG. 4 illustrates a flow diagram of a technique 400 for automating a headcount, according to an example embodiment. At 402, data can be received. The data can be received, at a web service server (e.g., service 216) or other device capable of processing the data. The data can include a plurality of RFID reader 102 unique identifiers, a plurality of transponder 104 unique identifiers detected by the plurality of RFID readers 102 during a headcount. The data received can include an amount of time it took to complete the headcount. At 404, the received data can be compared to data that is expected to be received. The comparison can include comparing the received plurality of transponder 104 unique identifiers to an expected set of transponder 104 unique identifiers to be received in the headcount. At 406, a determination of whether a discrepancy exists between the expected set of transponder unique identifiers and the received plurality of transponder unique identifiers can be made. The system 200 can determine whether an offender 105 associated with a transponder 104 that was not detected was moved. A message or alert can be sent to an entity in response to a discrepancy being determined. The message or alert can indicate that a transponder 104 of the expected set of transponders was not detected and a unique identifier of the offender 105 associated with the transponder 104 that was not detected. Data can be received that indicates a location of the offender 105 associated with the transponder 104 that was not detected.

Figure 5:
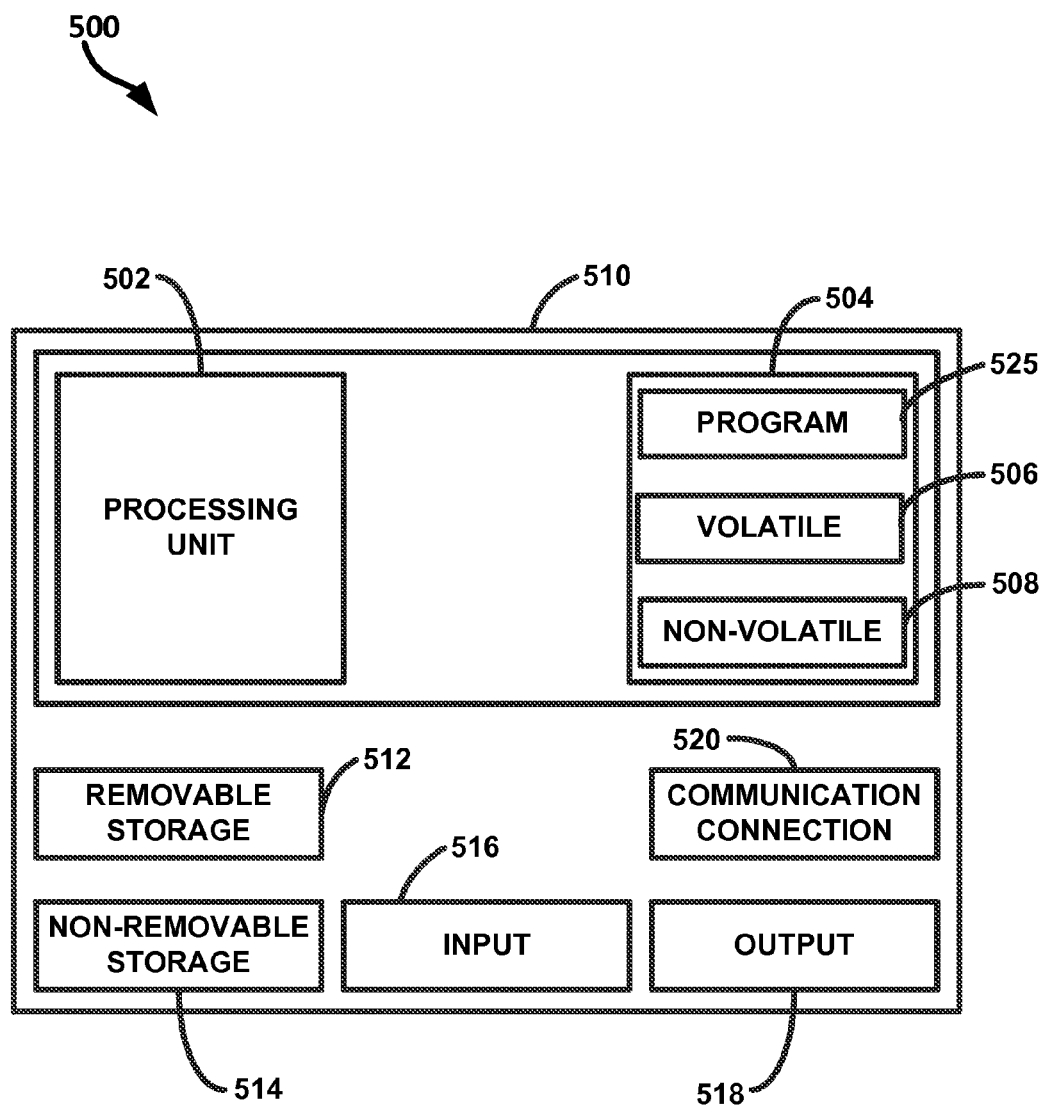
FIG. 5 illustrates an example of a computer system, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510 may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a non-transitory computer-readable medium. For example, a computer program 525 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 510 to provide generic access controls in a COM based computer network system having multiple users and servers.

The functions or algorithms described herein are implemented in hardware, software, or a combination of software and hardware in some embodiments. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely embodiments. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flows are applicable to software, firmware, and hardware implementations.

Systems and methods of the present disclosure may be implemented on a mobile device as a mobile application, web-based application, on a desktop computer as a computer application, or a combination thereof. A mobile application may operate on a Smartphone, tablet computer, portable digital assistant (PDA), ruggedized mobile computer, or other mobile device. The mobile device may be connected to the Internet or network via Wi-Fi, Wide Area Network (WAN), cellular connection, WiMax, or any other type of wired or wireless method of networking connection. In some embodiments, a web-based application may be delivered as a software-as-a-service (SaaS) package (e.g. cloud-based embodiments) accessible via a device app, a web browser application, or other suitable application, depending on the particular embodiment.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer readable storage device with instructions stored thereon, the instructions, which when executed by a machine, cause the machine to perform operations comprising:

receiving data including a plurality of radio frequency identification reader unique identifiers, the data including a plurality of transponder unique identifiers detected by the plurality of radio frequency identification readers during a headcount, wherein each radio frequency unique identifier is associated with an individual radio frequency identification reader and each transponder unique identifier is associated with an individual transponder, each individual radio frequency identification reader configured in association with a location and thereby identifying a location of the individual transponders, the received data including data representative of a direction of travel, as determined by a radar module of a radio frequency identification reader, associated with at least one of the transponder unique identifiers;

comparing the received plurality of transponder unique identifiers to an expected set of transponder unique identifiers to be received in the headcount and location where one or more of the individual transponder are to be located and not to be located;

determining if there is a discrepancy between the expected set of transponder unique identifiers, the received plurality of transponder unique identifiers, and locations where the individual transponders are to be and not to be located;

determining, in view of a stored offender relation restriction rule with regard to unique transponder identifiers of at least two individuals, whether the unique transponder identifiers of the at least two individuals will be at a same location based on a direction of travel associated with at least one unique transponder identifier of an individual of the at least two individuals, that the at least two individuals will be in the same location; and sending an alert to an entity in response to determining the stored offender relation restriction rule is violated by the at least two individuals being at the same location.

2. The computer readable storage device of claim 1, further comprising instructions, which when executed by the machine, cause the machine to perform operations comprising sending an alert to an entity in response to determining that there is a discrepancy in the headcount.

3. The computer readable storage device of claim 2, wherein the instructions for sending the alert include instructions, which when executed by the machine, cause the machine to send an alert that indicates that a transponder of the expected set of transponders was not detected and a unique identifier of the offender associated with the transponder that was not detected.

4. The computer readable storage device of claim 3, wherein the storage device further comprises instructions, which when executed by the machine, cause the machine to perform operations comprising before sending the alert, determining if the offender associated with the transponder that was not detected has moved.

5. The computer readable storage device of claim 4, wherein the instructions for receiving data includes instructions which cause the machine to receive data indicating an amount of time it took to complete the headcount.

6. The computer readable storage device of claim 5, the instructions for receiving data include instructions that cause the machine to receive, after the alert is sent, data indicating a location of the offender associated with the transponder that was not detected.

7. The computer readable storage device of claim 6, further comprising instructions, which when executed by the machine, cause the machine to perform operations comprising displaying headcount data including a date and time of a headcount, a location corresponding to the headcount, and a number of transponders expected to be detected from the headcount.

8. A method comprising:
receiving, at a web service server, data including a plurality of radio frequency identification reader unique identifiers, the data including a plurality of transponder unique identifiers detected by the plurality of radio frequency identification readers during a headcount, wherein each radio frequency unique identifier is associated with an individual radio frequency identification reader and each transponder unique identifier is associated with an individual transponder, each individual radio frequency identification reader configured in association with a location and thereby identifying a location of the individual transponders, the received data including data representative of a direction of travel, as determined by a radar module of a radio frequency identification reader, associated with at least one of the transponder unique identifiers;

comparing, using the web service server, the received plurality of transponder unique identifiers to an expected set of transponder unique identifiers to be received in the headcount and location where one or more of the individual transponder are to be located and not to be located;

determining if there is a discrepancy between the expected set of transponder unique identifiers the received plurality of transponder unique identifiers, and locations where the individual transponders are to be and not to be located;

determining, in view of a stored offender relation restriction rule with regard to unique transponder identifiers of at least two individuals, whether the unique transponder identifiers of the at least two individuals will be at a same location based on a direction of travel associated with at least one unique transponder identifier of an individual of the at least two individuals, that the at least two individuals will be in the same location; and sending an alert to an entity in response to determining the stored offender relation restriction rule is violated by the at least two individuals being at the same location.

9. The method of claim 8, further comprising sending an alert to an entity in response to determining that there is a discrepancy in the headcount.

10. The method of claim 9, wherein sending the alert includes sending an alert that indicates that a transponder of the expected set of transponders was not detected and a unique identifier of the offender associated with the transponder that was not detected.

11. The method of claim 10, further comprising, before sending the alert, determining if the offender associated with the transponder that was not detected has moved.

12. The method of claim 11, wherein receiving data includes receiving data indicating an amount of time it took to complete the headcount.

13. The method of claim 12, wherein receiving data includes receiving, after the alert is sent, data indicating a location of the offender associated with the transponder that was not detected.

* * * * *